(12) United States Patent
Kim (10) Patent No.: US 7,054,970 B2
(45) Date of Patent: May 30, 2006

(54) BUS ARBITER FOR INTEGRATED CIRCUIT SYSTEMS

(75) Inventor: Young-Sik Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 341 days.

(21) Appl. No.: 10/441,387

(22) Filed: May 19, 2003

(65) Prior Publication Data

US 2003/0221033 A1 Nov. 27, 2003

(30) Foreign Application Priority Data

May 21, 2002 (KR) ............................... 2002-28061

(51) Int. Cl.
*G06F 13/36* (2006.01)
(52) U.S. Cl. ..................................... 710/113; 710/240
(58) Field of Classification Search ........ 710/240–244, 710/113, 260–266
See application file for complete search history.

(56) References Cited

U.S. PATENT DOCUMENTS

| | | | | |
|---|---|---|---|---|
| 5,072,365 A | * | 12/1991 | Burgess et al. ............. | 710/264 |
| 6,092,137 A | * | 7/2000 | Huang et al. ............... | 710/111 |
| 6,145,040 A | * | 11/2000 | LaBerge et al. ............ | 710/107 |
| 6,473,817 B1 | * | 10/2002 | Jeddeloh ..................... | 710/113 |
| 2001/0056515 A1 | * | 12/2001 | Jacobs et al. ............... | 710/240 |
| 2003/0046510 A1 | * | 3/2003 | North ......................... | 711/203 |

FOREIGN PATENT DOCUMENTS

| | | |
|---|---|---|
| JP | 06-096014 | 4/1994 |
| JP | 2001-273248 | 10/2001 |

* cited by examiner

*Primary Examiner*—Rehana Perveen
*Assistant Examiner*—Kim T. Huynh
(74) *Attorney, Agent, or Firm*—F. Chau & Associates LLC (57) ABSTRACT

Systems and methods for bus arbitration in an integrated circuit system, which prevent discrepancies of bus occupation rates (or the number of bus occupancies) and which provide programmable bus occupation rates for bus masters. In one aspect, a bus arbiter for an integrated circuit system including a plurality of bus masters, comprises a program file comprising a plurality of program registers, wherein each program register is associated with one of the bus masters and stores a predetermined value of a bus occupation rate assigned to the bus master, a temporary file comprising a plurality of temporary registers, wherein each temporary register is associated with one of the bus masters and stores a current value of the bus occupation rate of the bus master, and a point register that designates the bus master having the highest priority among the bus masters at a given time.

15 Claims, 7 Drawing Sheets

BUS ARBITER FOR INTEGRATED CIRCUIT SYSTEMS

CROSS-REFERENCE TO RELATED APPLICATION

This application claims priority to Korean Patent Application No. 2002-28061, filed on May 21, 2002, which is incorporated herein by reference.

FIELD OF THE INVENTION

The present invention generally relates to bus systems for integrated circuit apparatuses and more specifically, to systems and methods for arbitrating and controlling bus occupancy in integrated circuit systems.

BACKGROUND

In general, bus systems are employed for conducting interface operations for data and control signals between various functional devices in computing or data processing apparatuses. For example, a system-on-a-chip (SOC) usually comprises a bus system for interconnecting functional blocks in operation. It is desirable to develop bus systems that are inexpensive and comprise non-complex frameworks.

Figure 1:
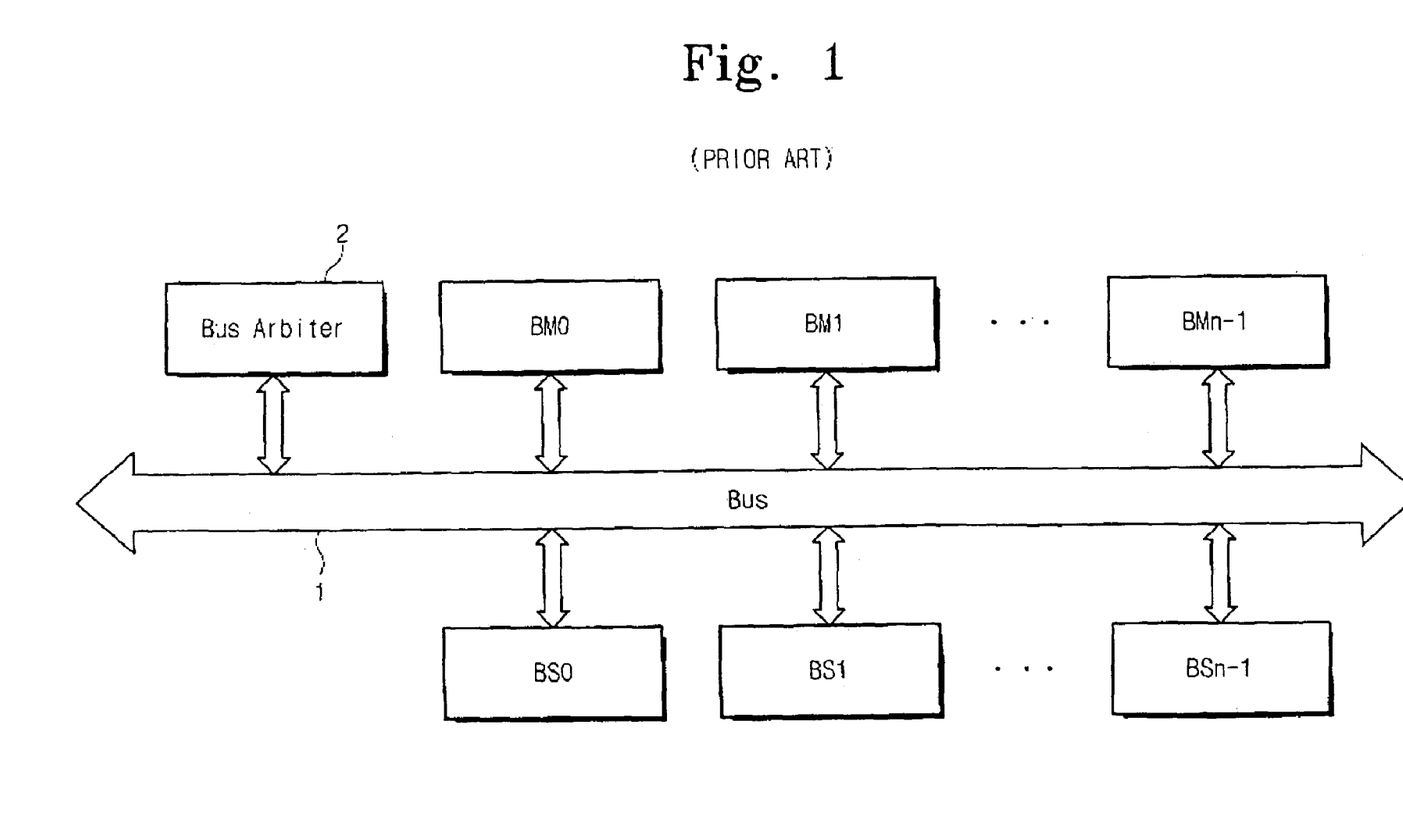
FIG. 1 is a block diagram of a conventional bus system.

A typical bus system, as shown in FIG. 1, generally comprises a bus (1), a bus arbiter (2), and a plurality of bus masters (BM0~BMn-1) and bus slaves (BS0~BSn-1). A bus master can read/write data from/to a desired one of the bus slaves, when the bus master sends a bus request to the arbiter (2) and is granted bus ownership by the bus arbiter (2). The bus (1) occupation is limited one access per request. The bus slaves are not able to request access to the bus (1), but merely respond to requests from a bus master by reading data or by writing data to the bus (1). The bus arbiter (2) grants bus ownership to the bus master having the highest priority, when multiple bus requests are received by the arbiter (2).

There are various types of bus masters that may be embedded in SOCs. For instance, bus masters include central processor units (CPUs), general-purpose direct memory access (DMA) controllers, dedicated direct memory access (DMA) controllers, etc. Examples of bus slaves are external memory controllers, or universal asynchronous receiver and transmitter (UART), etc.

The type of bus arbiter that can be implemented for a given system depends, for example, on the structural features of the system and the intended application. For example, an equitable arbitration process may be used to enhance overall performances in the system by eliminating bus starvations in which some bus masters with lower priorities for bus occupation are not granted bus ownership as needed.

The techniques for arbitrating bus occupation are classified into several types, as shown in the following table, based on the rule for establishing priorities and the ability to program bus occupancies for the bus masters.

TABLE 1

| | | Priority decision rule | |
|---|---|---|---|
| | | Fixed | Round-robin |
| Programmability | Possible | (a) Fixed Priority | (b) Fixed Bus occupation rate (1/n) |
| | Impossible | (c) Adjustable Priority | (d) Adjustable Bus occupancy rate |

The fixed priority (a) is the simplest method for bus arbitration, but is incapable of adjusting the priorities of bus occupation and may cause bus starvation. However, method (a) is advantageous for high-speed operation and can be implemented using a non-complex architecture. Although the arbitration method (c) provides adjustable priorities, bus starvation can still occur. With respect to the round-robin methods, the fixed bus occupation rate method (b) eliminates the problem of bus starvation that may occur using arbitration methods (a) and (c) by establishing each bus occupancy rate as 1/n for each bus master. However, the method (b) does not allow, for example, the bus occupation rate for a specific bus master to be increased when a given bus master requires more times of bus occupation than any other bus masters in a SOC system including a plurality of bus masters and slaves.

Figure 2:
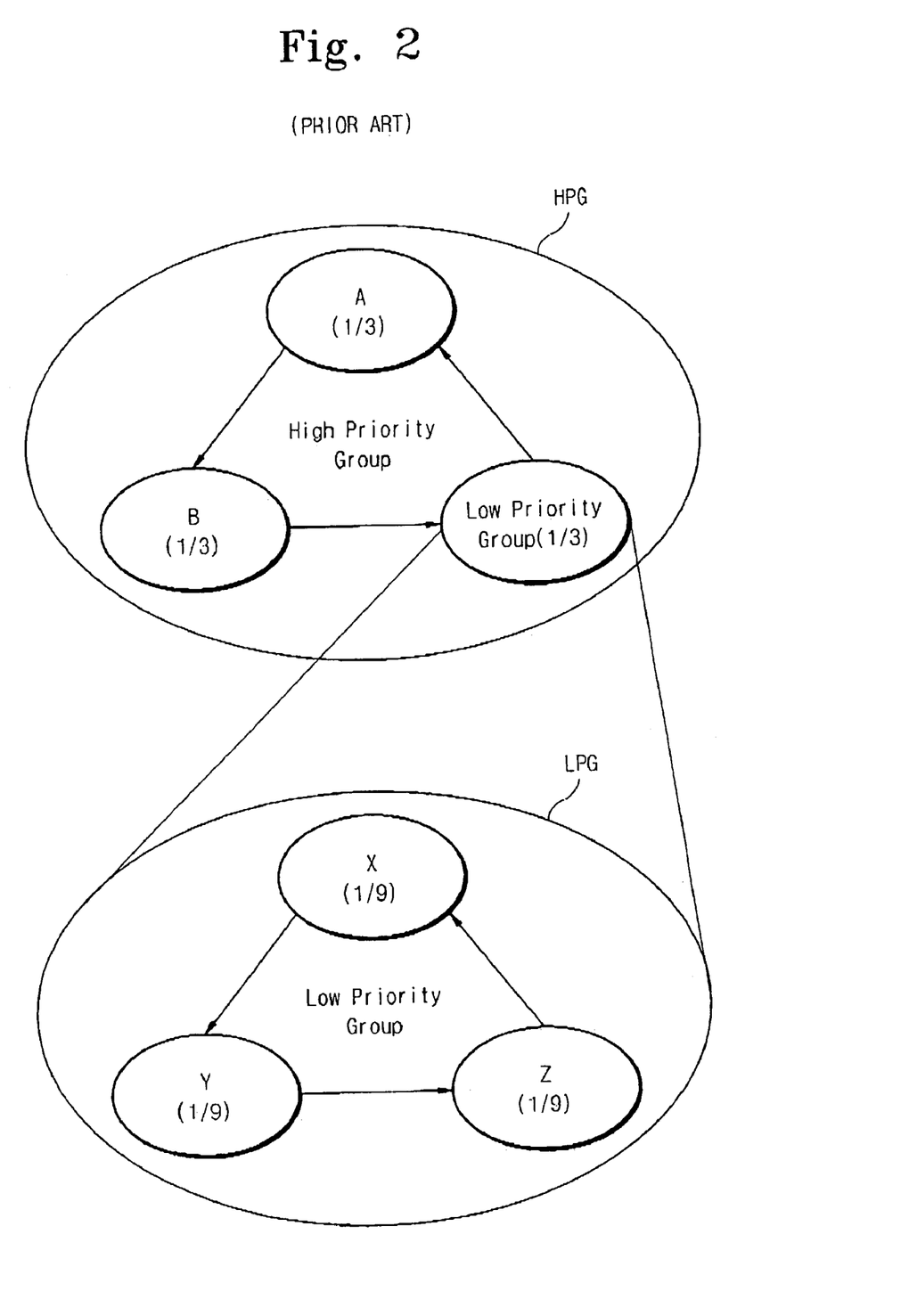
FIG. 2 is a schematic diagram illustrating a bus arbitration method based on a transitional Round-Robin mechanism.

The adjustable round-robin method (d) addresses the problems associated with the methods (b) and (c), whereby bus occupation is arbitrated by dividing the bus masters into groups as shown in FIG. 2 (refer to "PCI system architecture" proposed by Tom Shanley & Don Anderson; Addision-Wesley Publishing Company, Fiurth edition). Referring to FIG. 2, the bus masters A, B, X, Y, and Z are divided into two groups, e.g., a higher-priority group HPG and a lower-priority group LPG. The group HPG includes the bus masters A and B, while the group LPG includes the bus masters X, Y, and Z. Assuming that there are consequent bus requests from the bus masters, an order for bus ownerships may be arranged as follows: A-B-X-A-B-Y-A-B-Z-A-B-X-... Assuming that nine bus requests have been generated by the bus masters, bus occupation rates are settled such as A=3/9=1/3, B=3/9=1/3, X=1/9, Y=1/9, and Z=1/9. The arbitration mechanism of FIG. 2, however, has limitations in adjusting bus occupation rates for the bus masters.

The arbitration methods summarized in Table 1 can be implemented in bus systems requiring high-frequency operations. Bus arbitration methods that allow bus occupation rates to be programmed with desirable values without limitations are preferably implemented for systems such as data communications or remote communications. For instance, a time interval of bus occupancy for a selected bus master can be programmed to retain predetermined data rates assigned to the selected bus master. However, this arbitration method, although suitable for data communication systems, is problematic in systems such as SOCs where bus requests occur very dynamically at every clock cycle. In addition, such methods require complex algorithms and hardware architectures.

The benefits of controlling bus occupation rates of bus masters arise from the facts that: (1) bus masters that are functionally different may request bus occupation rates that are different (e.g., it is desirable to have different occupation rates for a 100 Mbps Ethernet module and a 120 Mbps USB module; (2) there may occur an equitable bus request by a specific bus master (e.g., a multi-channel DMA controller with a one-time bus request through a channel arbiter thereof may have a lower bus occupation rate than the others, or either the data amount or the formation of transaction data to be dealt by each bus master after obtaining a bus ownership may be variable such as single or burst); and (3) there is a need to increase or to decrease a bus occupation rate for a specific bus master in accordance with the current application system.

SUMMARY OF THE INVENTION

The present invention is directed to systems and methods for providing bus arbitration in an integrated circuit system (such as a SOC system), which provide reliable and efficient bus occupation arbitration by preventing discrepancies of bus occupation rates (or the number of bus occupancies) and providing programmable bus occupation rates for bus masters.

In one embodiment of the invention, a bus arbiter for an integrated circuit system including a plurality of bus masters, comprises a program file comprising a plurality of program registers, wherein each program register is associated with one of the bus masters and stores a predetermined value of a bus occupation rate assigned to the bus master, a temporary file comprising a plurality of temporary registers, wherein each temporary register is associated with one of the bus masters and stores a current value of the bus occupation rate of the bus master, and a point register that designates the bus master having the highest priority among the bus masters at a given time.

The bus masters apply bus request signals to the bus arbiter and receive bus grant signals from the bus arbiter. Preferably, the value of the bus occupation rate stored in the temporary register is restored to the value of the program register when the value of the temporary register has spent out.

In another embodiment of the invention, a method for performing bus arbitration comprises assigning a bus occupation number to each of a plurality of bus masters and designating a bus master having the highest priority among the bus masters, granting bus ownership to a current-requesting bus master, decreasing the bus occupation number associated with the designated bus master, if the designated bus master is the current-requesting bus master; and decreasing the bus occupation numbers associated with the designated bus master and the current-requesting bus master, if the current-requesting bus master is not the designated bus master.

Preferably, when one of the bus masters is a central processor unit that has a higher bus occupation rate than the others the central processor unit is assigned to have more than a half of the whole occupation rate at least.

These and other embodiments, aspects, features, and advantages of the present invention will become apparent from the following detailed description of the preferred embodiments, which is to be read in connection with the accompanying drawings, wherein like reference symbols indicate the same or similar components.

DETAILED DESCRIPTION OF PREFERRED EMBODIMENTS

Practical embodiments of the invention will now be explained in conjunction with FIGS. 3–7. It should be understood that the illustrative and exemplary embodiments in the following description are set forth to provide a thorough understanding of the present invention, and that nothing herein should be construed as a limitation of the invention.

Figure 3:
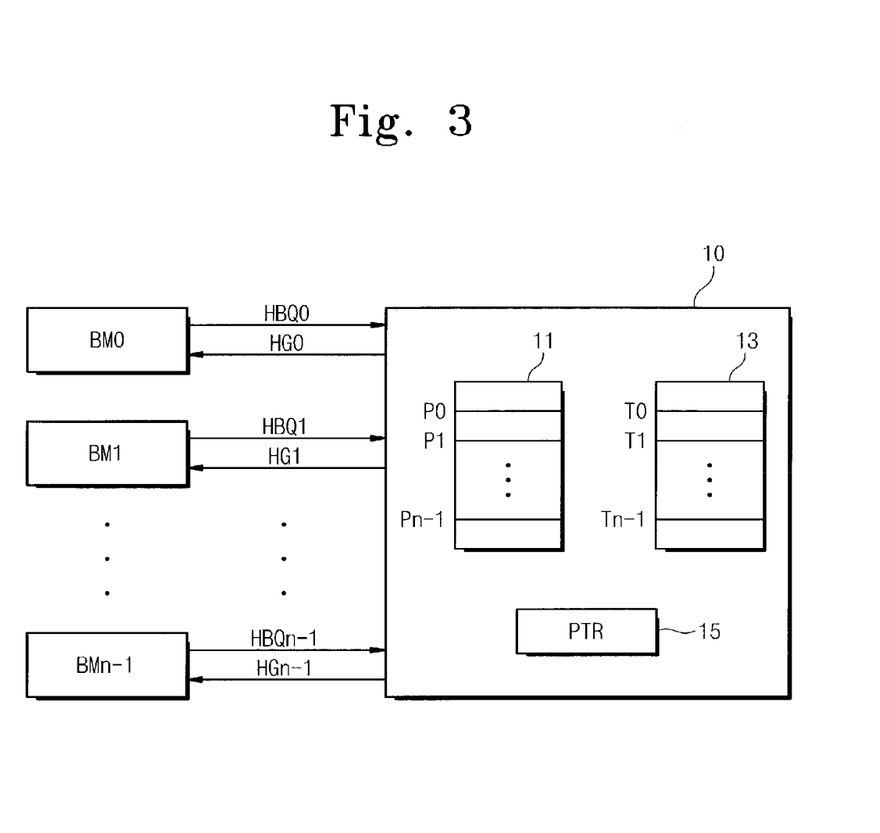
FIG. 3 is a block diagram of a bus arbitration system according to an embodiment of the present invention.

FIG. 3 is a diagram illustrating a bus arbitration system according to an embodiment of the invention. It is to be appreciated that a bus arbiter according to the invention may be implemented in a SOC system. In FIG. 3, a plurality of bus masters (BM0~BMn-1) transmit bus request signals (HBQ0~HBQn-1) to a bus arbiter (10) and receive bus grant signals (HG0~HGn-1) from the bus arbiter (10), respectively. The bus arbiter (10) preferably comprises a program register file (11) which stores programmed data specifying the bus occupation rates for the bus masters, a temporary register file (13) which stores information specifying the bus occupation rates during bus arbitration, and a point register (15) which designates the bus master (BMptr) having the highest priority at the current time. The program register file (11) comprises program registers (P0~Pn-1) that correspond to the bus masters (BM0~BMn-1), respectively. In addition, the temporary register file (13) comprises temporary registers (T0~Tn-1) that correspond to the bus masters (BM0~BMn-1), respectively. After the point register (15) designates the bus master (BMptr) having the highest priority, and after the bus occupation rates for the bus masters are written in the corresponding program registers, bus arbitration is performed for a bus master designated by the point register (15) and the bus occupation rate assigned thereto are adjusted and stored in the corresponding temporary register. The programmed values stored in the program registers (P0~Pn-1) (i.e., the bus occupation rates for the bus masters) determine the allowable number of bus occupations for the bus masters (hereinafter, referred to "bus occupation times"). For instance, in an exemplary embodiment where bus arbitration among three masters (BM0, BM1 and BM2) is performed, if a current value of the point register PTR (15) is "0" and the register P0 stores "2", the bus master BM0 is designated the highest priority bus master for three times (based on Equation 1 below).

More specifically, assuming that the program register file (11) stores program data having "x" number of bits for the bus masters (BM0~BMn-1), a bus occupation rate of a certain bus master BMi (i=0, 1, . . . n-1) is set to a value of (0 . . . or $2^x-1$) in its corresponding program register Pi, depending on an initial priority as desired. The bus arbiter (10) controls each bus occupation rate for each bus master with reference to the programmed values stored in the register file (11). A value of the bus occupation rate BORi for a certain bus master BMi is preferably determined by the following equation:

$$BOR_i = (P[i]+1)/\Sigma(P[i]+1) \quad \text{Equation 1}$$

; where P[i] is a value of the program register Pi.

Figure 4:
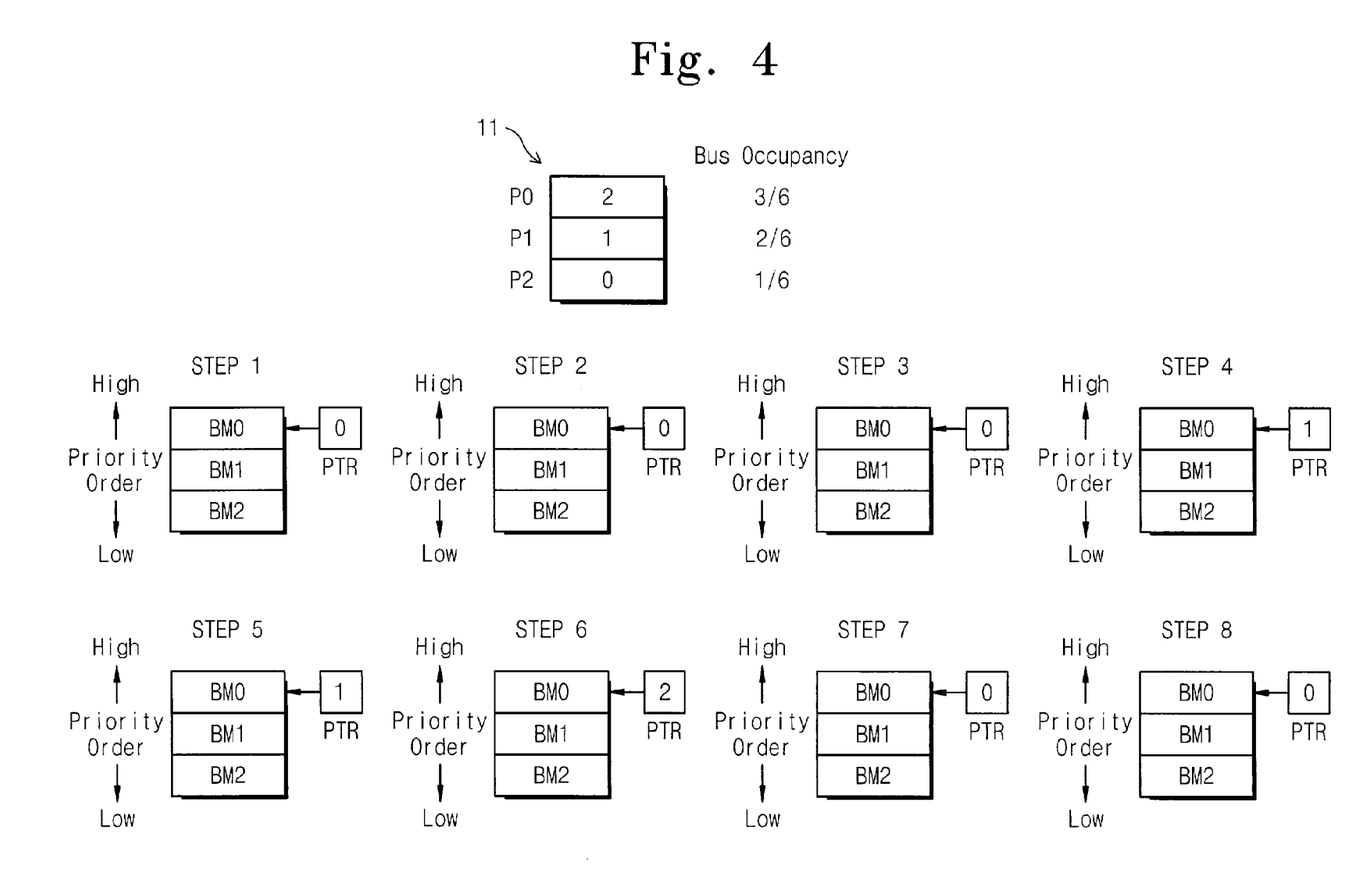
FIG. 4 is an exemplary state diagram illustrating a bus arbitration method according to an embodiment of the invention.

FIG. 4 is an exemplary state diagram illustrating a bus arbitration method according to an embodiment of the invention. More specifically, FIG. 4 illustrates a procedure for controlling bus occupation rates and priorities by means of the bus arbiter (10), assuming the number of the bus masters is three (n=4). If the three bus masters (BM0, BM1 and BM2) are assigned program register values P[0]=2, P[1]=1, and P[2]=0, respectively, the predicted bus occupation rates for such bus masters, by means of Equation 1, will be BOR[0]=(2+1)/(3+2+1)=3/6, BOR[1]=(1+1)/(3+2+1)=2/6, and BOR[2]=(0+1)/(3+2+1)=1/6, respectively. In FIG. 4, for a series of eight steps, the priorities of the bus masters (BM0~BM2) change in the order of BM0->BM0->BM0->BM1->BM1->BM2->BM0->BM0, in response to the PTR's turn of 0->0->0->1->1->2->0->0. Therefore, in general, if a present value of the point register PTR (15) is "i", the priorities for the bus masters are set in the order of BMi->BMi+1-> . . . - >BMn-2->BM0->BM1->BMi-1, in which each bus master spends out its predetermined occupation rate as established in the program register.

On the other hand, there may be discrepancies between the actual and predicted values of bus occupation rates when a bus master currently designated with the highest priority does not generate bus requests at every time. For example, assuming that PTR designates the bus master BM0, if the bus master BM0 does not assert as many bus requests as the designated occupation rate P[0]=2 (which equates to 3 requests via Equation 1), the bus occupation rate of bus master BM1, which has the next priority, increases (e.g., BOR1>2/6) to result in a discordance for the actual occupation rate.

Considering a situation with discrepancy of bus occupation rates, the bus arbiter reduces the value of the temporary register corresponding to the bus master that occupies the bus regardless that such bus master is not designated by the point register (15) as the bus master (BMptr) currently having the highest priority. In addition, when there is no occupation by the bus master (BMptr) designated as having the highest priority (but which has not requested bus ownership), the arbiter (10) reduces the value of the temporary register corresponding to such bus master. It is to be appreciated that these adjustments of the bus occupation rates advantageously eliminate bus starvations or excessive bus occupations for specific bus masters as a result of the discrepancies between the actual and predetermined (predicted) bus occupation rates.

Figure 5:
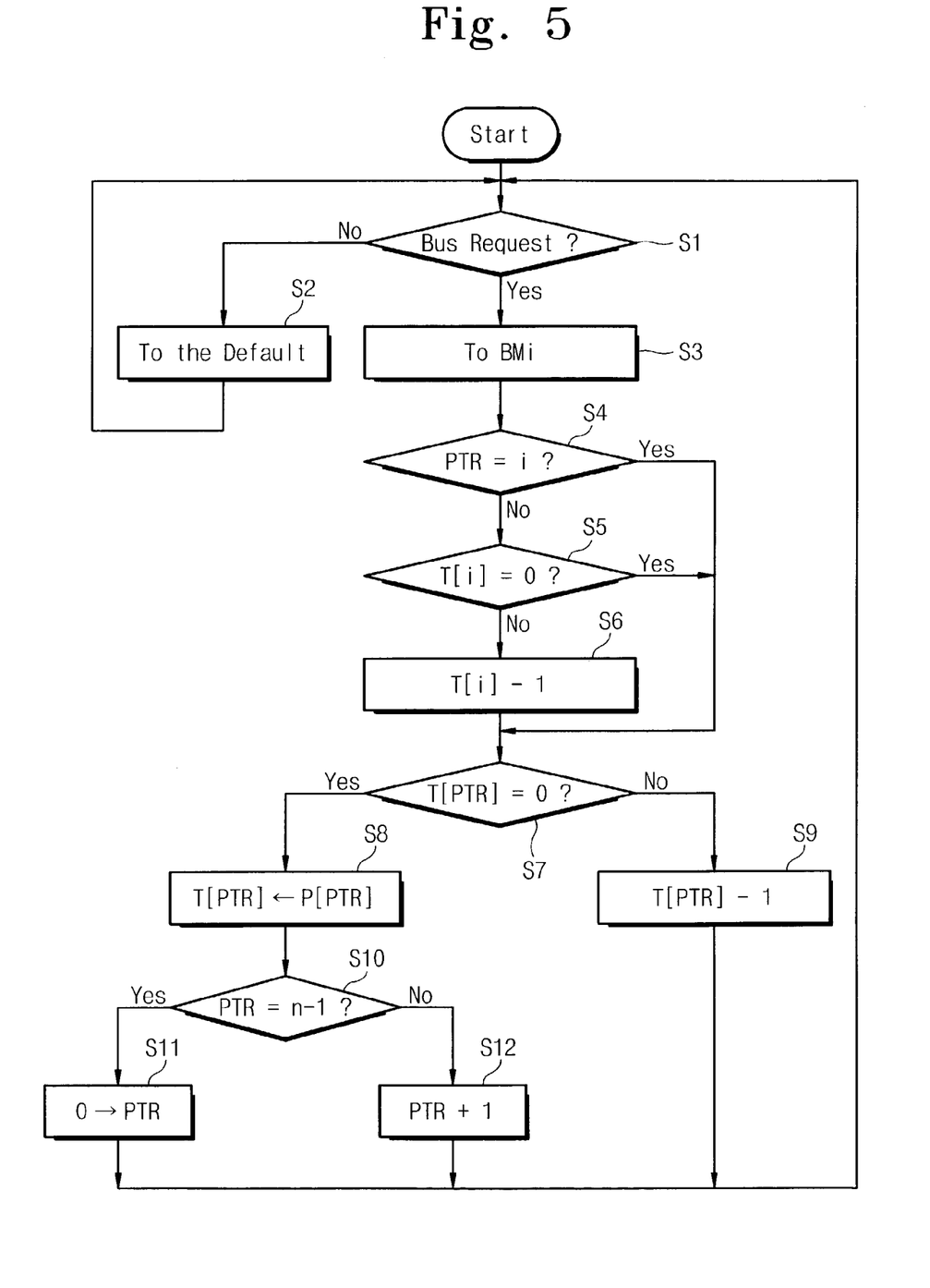
FIG. 5 is a flow diagram illustrating a bus arbitration method according to an embodiment of the invention.

FIG. 5 is a flow diagram illustrating a bus arbitration method according to an embodiment of the present invention. More specifically, FIG. 5 illustrates a mode of operation of the bus arbiter (10) depicted in FIG. 3. Initially, the bus arbiter determines if a bus request has been received from the bus masters BM0~BMn-1 (step S1). If there is no bus request (negative determination in step S1), bus ownership is granted to a default bus master (step S2), which may be a microprocessor unit, for example.

When a bus request has been received from at least one of the bus masters BM0~BMn-1 (affirmative determination in step S1), the arbiter grants bus ownership to the first current-requesting bus master (BMi) (step S3). Next, a determination is made as to whether or not the current PTR designates the bus master BMi that is currently occupying the bus (step S4) (i.e., BMi is the identical to the most prior bus master BMptr established by the point register 15). If PTR is "i" (affirmative determination in step S4), that is the current-requesting bus master is also currently designated as the bus master BMptr having the highest priority), then the process flow continues as step sS7. If PTR is not "i" (negative determination in step S4), that is the current-requesting bus master is not currently designated as the bus mater BMptr having the highest priority, then the process flow continues in step S5.

In step S5, since the bus master BMptr designated in PTR does not have bus ownership (or does not assert a bus request), a determination is made as to whether or not the temporary register value T[i] corresponding to the current-requesting bus master BMi is "0". As note above, the initial value of T[i] is the value that is fetched from the program register value P[i], which corresponds to the bus master BMi, containing the programmed number of bus occupations for BMi (e.g., "1" for BM1 in FIG. 4 if BMi is BM1, which equates to 2/6bus occupations using Equation 1 above).

If T[i] is not "0" (negative determination in step S5), then T[i] is reduced by 1(step S6) because the bus master BMi has occupied the bus one time actually. On the other hand, if T[i] is "0" (affirmative determination in step S5), then the process flow continues with step S7.

At step S7, there can two conditions: (1) the highest priority bus master BMptr (as designated by PTR) is identical to the current-requesting bus master BMi (as determined in step S4); or (ii) the number of bus occupations for the current-requesting BMi has been spent out entirely. A determination is made as to whether or not T[PTR] is equal to "0" (step S7), where T[PTR] denotes the temporary register value corresponding to the bus master BMptr. If T[PTR] is "0" (affirmative determination in step S7), then processes flow continues with step S8. On the other hand, if T[PTR] is not equal to "0" (negative determination in step S78), then process flow continues with step S9.

In the step S8, if the number of bus occupations for the currently designated highest priority bus master BMptr has been spent out, T[PTR] is restored to P[PTR]. On the other hand, in step S9, T[PTR] is decreased by 1 because there are some remaining bus occupations for BMptr and BMptr can continue with bus occupations until T[PTR] is decreased to "0". Meanwhile, step S9 is carried out, regardless of the fact that the current-requesting bus master BMi is currently designated as the highest priority bus master BMptr, if T[PTR] is "0" at present. The reason is that: (1) when the current-requesting bus master BMi is not identical to the currently designated highest priority bus master BMptr, the actual value T[PTR] is matched with its predicted (programmed) value, to thereby prevent discrepancy of the bus occupation for BMptr; or (2) when the current-requesting bus master BMi is identical to the currently designated highest priority bus master BMptr, the actual value T[PTR] as a matter of course must be decreased by 1 because there has actually been a one time bus occupation by BMptr.

In step S10, for the purpose of the next designated highest priority bus master, a determination is made as to whether or not a current value of PTR is n-1. If PTR is equal to n-1 (affirmative determination in step S10), which indicates a termination of bus occupation by all the bus masters, then PTR is reset to "0" (step S11) and the process flow returns to S1 for a new cycle of bus arbitration. If PTR is not equal n-1 (negative determination in step S10), which indicates that there are some remaining bus masters that may need to occupy the bus, the process flow returns to step S1 to start the bus arbitration process for the next bus master.

Thus, from the operational flow of FIG. 5 as discussed above, there are two sequential routes that are distinguished in accordance with a relative state between a current value of PTR and the current-requesting bus master.

First, in the case that the highest priority bus master BMptr as designated by the point register (15) is the same as the current-requesting bus master BMi (i.e., the currently designated highest priority bus master BMptr is the bus master currently requesting bus ownership), the bus masters will occupy the bus in the priority orders established by PTR in accordance with sequential steps S1->S3->S4->S7->S9, each by the number of bus occupations (i.e., the bus occupation rate). For instance, with FIG. 4, the order of bus occupation is BM0->BM0->BM0->BM1->BM1->BM2.

Second, in the case that the highest priority bus master BMptr as designated by the point register 15 is different from the current-requesting bus master BMi (i.e., a bus master other than the currently designated highest priority bus master BMptr, is currently requesting bus ownership). If the all the bus occupations T[i] of the current-requesting bus master BMi have been used, the arbitration process proceeds as S1->S3->S4->S5->S7->S9. If there are any remaining bus occupations for a given BMi, step S6 is performed after step S5 and before S7.

Figure 6:
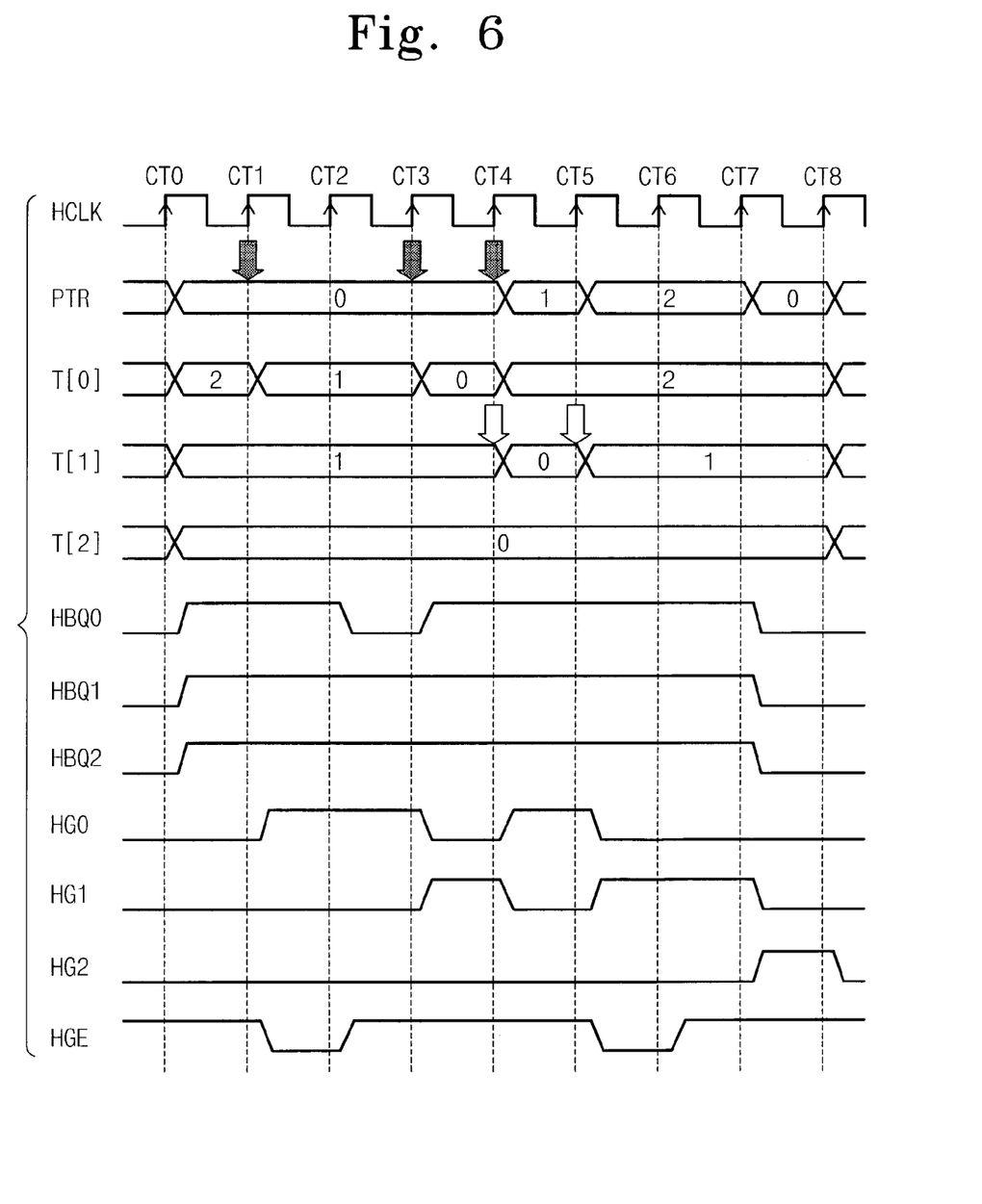
FIG. 6 is an exemplary timing diagram illustrating a bus arbitration method according to an embodiment of the invention.
Figure 7:
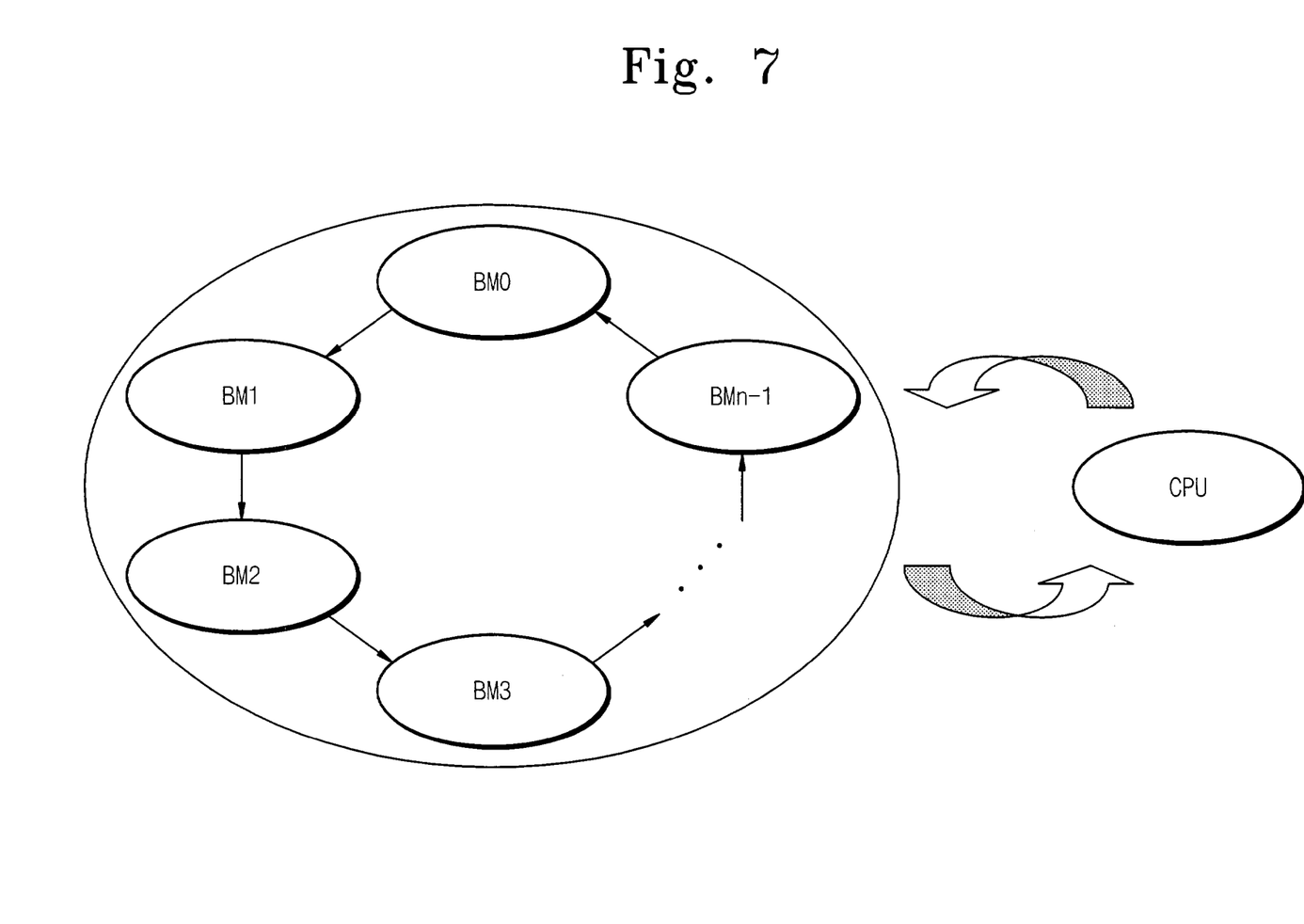
FIG. 7 is a diagram illustrating a bus arbitration method according to an embodiment of the present invention.

FIG. 6 is an exemplary timing diagram illustrating a bus arbitration method according to an embodiment of the invention. The example in FIG. 6 illustrates a method of arbitrating bus occupations for three bus masters BM0, BM1 and BM2, as in FIG. 4. A clock signal HCLK is used for controlling activation of signals and data transmissions, wherein such control is synchronized to the rising edges of the clock signal HCLK. CT0~CT8 denotes the clock cycles of HCLK. HBQ0~HBQ2 denote bus request signals transmitted to a bus arbiter from the bus masters BM0~BM2, respectively. HG0~HG2 denote bus grant signals transmitted to respective bus masters BM0~BM2 from the bus arbiter. A control signal HGE is to enable (logic "high") a bus arbitrating operation and to prohibit (logic "low") a bus arbitrating operation while a bus master having bus ownership is continuously occupying the bus for several clock cycles.

First, at the beginning of clock cycle CT0, all bus request signals are logic "low" and thus no bus master has requested bus ownership to the bus arbiter (10). The value of the point register PTR (15) designates BM0 by maintaining "0" from CT1 to CT4, designates BM1 between CT4 and CT5, and designates BM2 between CT5 and CT7, as the currently designated highest priority bus master BMptr.

Next, at the beginning of clock cycle CT1, all bus request signals HBQ0, HBQ1, and HBQ2 are asserted (all logic "high") indicating that all bus masters BM0, BM1 and BM2 are requesting bus ownership. Further, in clock cycle CT1, PTR=0, T[0]=2, T[1]=1, and T[2]=0. Thus, the bus arbiter (10) grants the bus ownership to bus master BM0, which is currently designated as having the highest priority (i.e., PTR=0), by asserting a bus grant signal HG0 of logic "high". In addition, T[0] is decreased by 1 such that T[0] =2-1=1 (which means that the actual number of remaining bus occupations for BM0 is 2).

Next, at the beginning of clock cycle CT2, T[0] is set to 1. The bus request signal HBQ0 is asserted (logic "high") indicating that bus master BM0 is requesting bus ownership. In such case, bus ownership is granted to BM0. At this time, the control signal HGE is inactive with a logic "low" level, which prohibits the bus arbitrating operation regardless of current states of the bus request signals. However, during the second clock cycle CT2, the bus request signal HBQ0 of BM0 is de-asserted, which causes the control signal HGE to become active with a logic "high" level.

Then, at the beginning of clock cycle CT3, with an active state of the control signal HGE (logic "high"), since the currently designated highest priority bus master BM0 does not request a bus occupation (HBQ is logic "low"), the bus ownership is granted to bus master BM1 which is requesting the bus occupation since BM1 is the next bus master with scheduling priority. Since BM0 has not actually occupied the bus, T[0] assigned to BM0 becomes 0 after decreasing by 1 in order to prevent the discrepancy on the bus occupation rate (T[0]=1-1=0).

Next, at the beginning of clock cycle CT4, T[0]=0, the bus grant signals HG0~HG2 are all logic "high" levels and the control signal HGE is a logic "high" level. Since the currently designated highest priority bus master BM0 is requesting bus occupation, the bus ownership is granted to BM0. Now, since T[0] is "0", T[0] is restored to the value of P[0], i.e., "2". At this time, since the bus grant signal HG1 for BM1 is a logic "high" level in the condition of PTR=0, T[1] decreases by 1 (T[1]=1-1=0). And, now T[0] for BM0 is "0" (i.e., BM0 spent out the number, of bus occupation), PTR increases by 1 (PTR=1) to designate BM1 as the bus master currently having the highest priority.

Next, at the beginning of clock cycle CT5, PTR=1, T[0]=2, T[1]=0, and HG0 and all the bus request signals HBQ0~HBQ2 are logic "high" levels. Therefore, bus ownership is granted to the bus master BM1 as being the currently designated highest priority bus master via point register (15). Since T[1] corresponding to BM1 is now "0", T[1] is restored to P[1], i.e., "1". And, since BM1 used all bus occupations as programmed in the register P1 in accordance with its bus occupation rate, PTR increases by 1 (PTR=2) to designate BM2 as the bus mater currently having the highest priority.

Next, at the beginning of clock cycle CT6, the bus control signal HGE becomes a logic "low" level as an inactive state to prohibit the bus arbitration.

Next, at the beginning of clock cycle CT7, since PTR=2, and since the currently designated highest priority bus master BM2 is requesting the bus occupation (HBQ2 is a high level), bus ownership is granted to BM2 by asserting a bus grant signal HG2 of a logic "high" level. Then, T[2] corresponding to BM2 is restored to P[2] from "0" and PTR changes to 0.

Finally, at the beginning of clock cycle CT8, there is no bus occupation because none of the bus masters are requesting the bus ownership, even though the bus control signal HGE is active.

Throughout the procedure until clock cycle CT8, the bus masters BM0~BM2 are controlled to occupy the bus three times, twice, and once, respectively. In clock cycle CT3, since the bus master BM0 does not request bus occupation, regardless that BM0 is designated as having the highest priority in clock cycle CT3, the value of T[0] decreases by 1 anyway, to thereby accord the temporary register value with the actual number of bus occupation. In other words, the value of the temporary register corresponding to the current highest priority bus master (as designated by the value of point register PTR) decreases by 1 every bus occupation, regardless of whether or not such currently designated bus master has bus ownership. In addition, a temporary register value for a bus master that is not currently designated by PTR will decrease by 1 every occupation.

In another embodiment of the invention, a central processor unit (CPU) as one of the bus masters is operable with a very high bus occupation rate without every bus request from the other bus masters. In such case, referring to FIG. 7, a bus arbitration method may render the CPU to be assigned as the default bus master with a bus occupation rate over 50%, with the remaining bus occupation rate being allocated to the other bus masters.

As aforementioned, the present invention provides systems and methods for improved bus arbitration, which prevent discrepancies for bus occupation rates as well as programming values for the bus occupation rates.

Although preferred embodiments of the present invention have been disclosed for illustrative purposes, those of ordinary skill in the art will appreciate that various modifications, additions and substitutions are possible, without departing from the scope and spirit of the invention as described in the accompanying claims.

What is claimed is:

1. A bus arbiter for an integrated circuit system including a plurality of bus masters, comprising:
   a program file comprising a plurality of program registers, wherein each program register is associated with one of the bus masters and stores a predetermined value of a bus occupation rate assigned to the bus master;
   a temporary file comprising a plurality of temporary registers, wherein each temporary register is associated with one of the bus masters and stores a current value of the bus occupation rate of the bus master; and
   a point register that designates the bus master having the highest priority among the bus masters at a given time,
   wherein the bus arbiter grants bus ownership to a current-requesting bus master, wherein the bus arbiter decreases a current value of the bus occupation rate associated with the designated bus master, if the designated bus master is the current-requesting bus master, and wherein the bus arbiter decreases a current value of the bus occupation rate associated with the designated bus master and the current-requesting bus master, if the current-requesting bus master is not the designated bus master.

2. The bus arbiter of claim 1, wherein the bus masters assert bus request signals to the bus arbiter and receive bus grant signals from the bus arbiter.

3. The bus arbiter of claim 1, wherein the value of the bus occupation rate stored in a temporary register for a given bus master is restored to the predetermined value of the bus occupation rate stored in the program register for the given bus master when the value of the temporary register has spent out.

4. A method for performing bus arbitration, comprising the steps of:
   assigning a bus occupation number to each of a plurality of bus masters and designating a bus master having the highest priority among the bus masters;
   granting bus ownership to a current-requesting bus master;
   decreasing the bus occupation number associated with the designated bus master, if the designated bus master is the current-requesting bus master; and
   decreasing the bus occupation numbers associated with the designated bus master and the current-requesting bus master, if the current-requesting bus master is not the designated bus master.

5. The method of claim 4, wherein when one of the bus masters is a central processor unit that has a higher bus occupation rate than all other bus masters, assigning a bus occupation number for the central processor unit which provides a bus occupation rate that is greater than one-half of an entire occupation rate for all the bus masters.

6. A method for performing bus arbitration, comprising the steps of: assigning a bus occupation number to each of a plurality of bus masters and designating a bus master having the highest priority among the bus masters;
   determining if a bus request has been asserted by a current-requesting bus master;
   granting bus ownership to a default bus master, when no bus request has been asserted;
   determining if a current-requesting master is the designated bus master, when a bus request has been asserted by the current-requesting master;
   granting bus ownership to the designated bus master and decreasing the bus occupation number associated with the designated bus master, when the current-requesting bus master is the designated bus master; and
   granting bus ownership to the current-requesting bus master and decreasing the bus occupation numbers associated with the designated bus master and the current-requesting bus master, when the current-requesting bus master is not the designated bus master.

7. The method of claim 6, wherein the default bus master is a central processor unit.

8. The method of claim 7, wherein the central processor unit has a bus occupation rate that is greater than one-half an entire bus occupation rate for all the bus masters.

9. The method of claim 6, further comprising the step of determining if a current value of the bus occupation number of the current-requesting bus master is zero.

10. The method of claim 9, further comprising the step of restoring the current value of the bus occupation number of the current-requesting bus master to the assigned bus occupation number of the current-requesting bus master, when the current value is determined to be zero.

11. The method of claim 6, further comprising the step of determining if a current value of the bus occupation number of the designated bus master is zero.

12. The method of claim 11, further comprising the step of restoring the current value of the bus occupation number of the designated bus master to the assigned bus occupation number of the designated bus master, when the current value is determined to be zero.

13. A program storage device readable by a machine, tangibly embodying a program of instructions executable by the machine to perform method steps for performing bus arbitration, the method steps comprising:
   assigning a bus occupation number to each of a plurality of bus masters and designating a bus master having the highest priority among the bus masters;
   granting bus ownership to a current-requesting bus master;
   decreasing the bus occupation number associated with the designated bus master, if the designated bus master is the current-requesting bus master; and
   decreasing the bus occupation numbers associated with the designated bus master and the current-requesting bus master, if the current-requesting bus master is not the designated bus master.

14. The program storage device of claim 13, wherein when one of the bus masters is a central processor unit that has a higher bus occupation rate than all other bus masters, further comprising instructions for assigning a bus occupation number for the central processor unit to provide a bus occupation rate that is greater than one-half of an entire occupation rate for all the bus masters.

15. A program storage device readable by a machine, tangibly embodying a program of instructions executable by the machine to perform method steps for performing bus arbitration, the method steps comprising:

assigning a bus occupation number to each of a plurality of bus masters and designating a bus master having the highest priority among the bus masters;

determining if a bus request has been asserted by a current-requesting bus master;

granting bus ownership to a default bus master, when no bus request has been asserted;

determining if a current-requesting master is the designated bus master, when a bus request has been asserted by the current-requesting master;

granting bus ownership to the designated bus master and decreasing the bus occupation number associated with the designated bus master, when the current-requesting bus master is the designated bus master; and granting bus ownership to the current-requesting bus master and decreasing the bus occupation numbers associated with the designated bus master and the current-requesting bus master, when the current-requesting bus master is not the designated bus master.

* * * * *